US012668505B2

(12) United States Patent
Götz

(10) Patent No.: US 12,668,505 B2
(45) Date of Patent: Jun. 30, 2026

(54) FILTER CARTRIDGE AND WATER FILTER DEVICE

(71) Applicant: Christoph Götz, Garbsen (DE)

(72) Inventor: Christoph Götz, Garbsen (DE)

( * ) Notice: Subject to any disclaimer, the term of this patent is extended or adjusted under 35 U.S.C. 154(b) by 318 days.

(21) Appl. No.: 18/553,126

(22) PCT Filed: Jan. 28, 2022

(86) PCT No.: PCT/EP2022/052100
§ 371 (c)(1),
(2) Date: Sep. 28, 2023

(87) PCT Pub. No.: WO2022/207155
PCT Pub. Date: Oct. 6, 2022

(65) Prior Publication Data
US 2024/0182327 A1 Jun. 6, 2024

(30) Foreign Application Priority Data

Mar. 31, 2021 (DE) ..................... 10 2021 001 668.8

(51) Int. Cl.
*B01D 35/157* (2006.01)
*B01D 35/30* (2006.01)
*C02F 1/00* (2023.01)

(52) U.S. Cl.
CPC ............ *C02F 1/003* (2013.01); *B01D 35/157* (2013.01); *B01D 35/30* (2013.01);
(Continued)

(58) Field of Classification Search
CPC ................ C02F 1/003; C02F 2201/005; C02F 2201/006; C02F 2307/04; C02F 2201/003;
(Continued)

(56) References Cited

U.S. PATENT DOCUMENTS

| | | | | |
|---|---|---|---|---|
| 4,772,386 A | * | 9/1988 | Grout ................... | B01D 35/143 |
| | | | | 210/100 |
| 5,328,597 A | * | 7/1994 | Boldt, Jr. ................ | C02F 1/003 |
| | | | | 222/23 |
| 6,360,764 B1 | * | 3/2002 | Fritze ................... | B01D 35/157 |
| | | | | 137/15.01 |

FOREIGN PATENT DOCUMENTS

| | | | | |
|---|---|---|---|---|
| DE | 202016008866 U1 | * | 3/2020 | .............. C02F 1/003 |
| DE | 102009000231 B4 | * | 11/2020 | .............. C02F 1/003 |
| | (Continued) | | | |

OTHER PUBLICATIONS

English translation of WO 2012168880, Dec. 13, 2012. (Year: 2012).*

(Continued)

*Primary Examiner* — Joseph W Drodge
(74) *Attorney, Agent, or Firm* — Ryder, Mazzeo & Konieczny LLC; Douglas J. Ryder

(57) ABSTRACT

What is proposed is a filter cartridge for a water filter device comprising an inflow funnel, which comprises a valve, which is arranged in a flow channel and which has a valve body (304), which can be moved in the axial direction, in order to close the flow channel in a first position of the valve body and to release it in a second position. The filter cartridge has a housing, which comprises an inflow opening for unfiltered raw water on an upper side and an outflow opening for filtered water on a lower side and which contains a filter medium. An inversion (402) is arranged on a lower side of the housing. A valve puller (502) is arranged in the inversion, which valve puller has a main part (505) and an actuation means (514), which is molded thereon and which extends away from the main part (505) in the axial direction and which comprises a receiving hole, which is delimited by a grip edge (509) and which is formed so that it allows the (Continued)

reception of an actuation section (606) of the valve body (304).

20 Claims, 8 Drawing Sheets

(52) U.S. Cl.
CPC .. *B01D 2201/167* (2013.01); *C02F 2201/005* (2013.01); *C02F 2201/006* (2013.01); *C02F 2307/04* (2013.01)

(58) Field of Classification Search
CPC .... C02F 2201/002; F16K 31/52; F16K 21/00; F16K 27/00; F16K 27/02; F16K 27/0254; F16K 31/52408; F16K 31/5245; F16K 31/528; F16K 31/60; B01D 27/00; B01D 27/08; B01D 35/157; B01D 35/1573; B01D 35/1576; B01D 35/30; B01D 2201/16; B01D 2201/167; B01D 2201/30
See application file for complete search history.

(56) References Cited

FOREIGN PATENT DOCUMENTS

| WO | WO-2004105916 | A1 | * | 12/2004 | .............. B01D 35/30 |
| WO | WO-2012168880 | A1 | * | 12/2012 | .............. C02F 1/003 |
| WO | WO-2016120174 | A1 | * | 8/2016 | ................ C02F 1/00 |
| WO | WO-2021019541 | A1 | * | 2/2021 | ................ C02F 1/68 |

OTHER PUBLICATIONS

English translation of DE 202016008866U1, Mar. 16, 2020. (Year: 2020).*

English translation of DE 102009000231B4, Nov. 19, 2020. (Year: 2020).*

English translation of WO 2021019541A1, Feb. 4, 2021. (Year: 2021).*

* cited by examiner

106

FILTER CARTRIDGE AND WATER FILTER DEVICE

FIELD

The invention relates to a filter cartridge for a water filter device for the filtration of liquids, in particular a filter cartridge for a water filter device, for example a table water filter device. The invention furthermore relates to a water filter device and a water filter device, which is equipped with a filter cartridge according to the invention.

BACKGROUND

Water filter devices are often used to improve the cleanness of water and in order to reduce or completely remove unwanted dissolved substances. Such devices will also be referred to below in short as filter device. For this purpose, the filter device is typically equipped with a filter cartridge, which can be replaced because the filter cartridge gets worn out during use. A filter material, which comprises, for example, activated carbon and an ion exchanger material in the form of a granulate, is contained in the filter cartridge for cleaning raw water and removal of dissolved substances.

Suspended matter is furthermore removed by means of fine meshed sieves or filter fabrics. The filter device is used, for example, as table water jug or table water filter device, respectively, as water tank of an appliance for preparing hot beverages, or as water tank in a refrigerator.

A table water filter device typically consists of a collecting vessel for receiving filtered water, in which an inflow funnel is inserted. The inflow funnel has a receiving chamber for a filter cartridge, into which unfiltered raw water flows, which leaves the filter cartridge again as filtered water. The inflow funnel has a reservoir for receiving the unfiltered raw water and an outflow opening, through which the filtered water leaves the inflow funnel, in order to be collected in the collecting vessel of the filter device. There are embodiments of such a filter device, in the case of which a valve is arranged in a flow channel, which leads to the outflow opening, which valve closes the outflow opening or the flow channel, respectively, if no or not matching filter cartridge is inserted in the inflow funnel. When a filter cartridge is inserted in the inflow funnel, the valve is opened in the outlet opening by means of mechanical interaction between a valve body and the filter cartridge.

Such a filter device is described, for example, in the DE 20 2016 008 866 U1. In a flow path for the filtered water, this filter device has a valve, which is opened in response to the insertion of a specifically designed filter cartridge. For this purpose, a valve body is provided with helical structures, which cooperate with corresponding structures in a filter cartridge, in order to open the valve. The valve does not have any advantages for many users in the practical handling of the filter device but has the disadvantage that a user can replace worn filter cartridges only with filter cartridges, which match the valve, which significantly limits the selection of filter cartridges for the maintenance of the filter device.

Based on this, an object of the present invention is to create an alternative filter cartridge, which can be used in a variety of ways in different filter systems.

DESCRIPTION OF THE INVENTION

To solve this object, the invention proposes, according to a first aspect, a filter cartridge for a water filter device comprising an inflow funnel, which comprises a valve, which is arranged in a flow channel and which has a valve body, which can be moved in the axial direction, in order to close the flow channel in a first position of the valve body and to release it in a second position. The filter cartridge has a housing, which comprises an inflow opening for unfiltered raw water on an upper side and an outflow opening for filtered water on a lower side and which contains a filter medium. An inversion is arranged on a lower side of the housing. A valve puller is arranged in the inversion, which valve puller has a main part and an actuation means, which is molded thereon and which extends away from the main part in the axial direction and which comprises a receiving hole, which is delimited by a grip edge and which is formed so that it allows the reception of an actuation section of the valve body.

The filter cartridge according to the invention can be used flexibly in water filter devices with or without a valve in a flow channel. In the first case, the valve puller realizes a simple pulling movement on the valve body, in order to open the valve in the flow channel. Concretely, the valve puller can lift the valve body off a valve seat in response to the insertion of the filter cartridge in the receiving chamber, whereby a flow path is opened. In the second case, i.e. in the case of a water filter device without valve, the valve puller remains without function. If the filter cartridge is to be adapted to valve bodies of different designs, it is sufficient to change the valve puller accordingly, for example to adapt its dimensions to another valve body. The remainder of the filter cartridge can remain unchanged. This flexibility offers advantages during the production of filter cartridges for different water filter devices.

In the case of an advantageous exemplary embodiment, the actuation means is formed in the shape of a truncated cone, the pointed end of which faces away from the main part. This shape of the actuation means is mechanically stable and is suitable to center the filter cartridge on a cylindrical pipe socket of the inflow funnel.

In the case of one embodiment, the lateral surface of the truncated cone is a closed wall. In the case of another embodiment, the lateral surface is interrupted by several windows, between which the lateral surface is reduced to strips. In the case of the embodiment with windows, the required force for frictionally coupling the actuation means to the valve body is smaller than in the case of the embodiment with a closed lateral surface.

According to a further development of the last-mentioned embodiment, the windows extend all the way to the receiving hole, so that one end of the strips is connected to the main part, and another end forms a free end. Compared to the other embodiments, this embodiment can be compressed most easily. The front faces of the strips are oriented axially and run obliquely with respect to the longitudinal direction of the strips.

In the case of an advantageous further development of the filter cartridge, the wall of the lateral surface is divided by means of slits into a plurality of lamellae, the one end of which is connected to the main part, and the other end of which forms a free end. In the case of this further development, an essentially closed lateral surface is attained, in the case of which a force for deforming the lateral surface is smaller than in the case of the embodiment with a completely closed lateral surface.

A pipe socket, which forms the grip edge, is advantageously molded on the pointed end of the truncated cone on the lateral surface. The pipe socket enlarges the grip edge, whereby the frictional coupling of the valve body to the valve puller is improved.

In the case of the alternative embodiments, the grip edge is formed by the free ends of the strips or the lamellae, respectively. The strips or the lamellae, respectively, have bearing surfaces, which are oriented in the axial direction and which bear against an outer circumference of the valve body.

It has proven to be advantageous to form humps, which are directed at the outer side of the lateral surface, on the strips. The humps rest on the pipe socket of the inflow funnel and define a support point for the strips. A deformation of the strips thus preferably takes place around the respective support point, which ensures a good reproducibility of the mechanical properties.

In the alternative, the strips are weakened at one point, in particular by means of notches. A deformation of the strips preferably takes place at the point where the mechanical weakening is arranged. Due to a corresponding positioning and dimensioning of the mechanical wakening, the bending properties of the strips can be defined in a simple way.

Spacing ribs are advantageously formed on the outer circumference of the main part, so that at least one gap is created between the main part and an inner side of the inversion in the housing of the filter cartridge. The spacing ribs ensure a flow path for filtered water in those cases when the actuation means seals the pipe socket in the inflow funnel with its outer face. In these cases, filtered water can flow off only through the receiving hole in the valve puller. The spacing ribs hold open a flow path for the filtered water to the receiving hole.

It has proven to be advantageous when the spacing ribs continue all the way to a front side of the main part. It is ensured thereby that a flow path for filtered water is also available between the main part and a bottom of the inversion in the filter cartridge.

The actuation means is advantageously formed elastically, which frictionally couples by means of the grip edge with the actuation section of the valve body when the actuation means is deformed in the radial direction. The deformation of the actuation means preferably takes place when the filter cartridge is inserted in the receiving chamber of the inflow funnel.

In the case of a preferred exemplary embodiment of the filter cartridge, positioning ribs are arranged on the main part, which extend perpendicular and in the same direction as the actuation means away from the main part. The positioning ribs ensure an improved stabilization of the valve puller on a pipe socket of an inflow funnel of a water filter device.

According to a second aspect of the invention, a valve puller for a water filter device comprising an inflow funnel is proposed, which comprises a valve, which is arranged in a flow channel and which has a valve body, which can be moved in the axial direction, in order to close the flow channel in a first position of the valve body, and to release it in a second position. The valve puller is dimensioned so that it fits into an inversion of a filter cartridge, which can be inserted in a receiving chamber of the inflow funnel. The valve puller has a main part and an actuation means molded thereon, which extends away from the main part in the axial direction and which comprises a receiving hole, which is delimited by a grip edge and which is formed so that it allows the reception of an actuation section of the valve body.

The valve puller is suitable to pull the valve body out of its first position into its second position in response to the insertion of the filter cartridge in the receiving chamber of the inflow funnel. A flow path for filtered water is opened thereby. The valve puller can be produced cost-efficiently as molded part and provides for the use of filter cartridges in water filter devices comprising a valve in the flow path, without these filter cartridges having to be adapted to the valve in the water filter device.

According to a third aspect of the invention, a water filter device comprising a filter cartridge according to the first aspect of the invention is proposed.

BRIEF DESCRIPTION OF THE DRAWING

The invention will be described in more detail below in an exemplary manner on the basis of an embodiment with reference to the accompanying figures. All figures are purely schematic and not to scale, in which.

Figure 1:
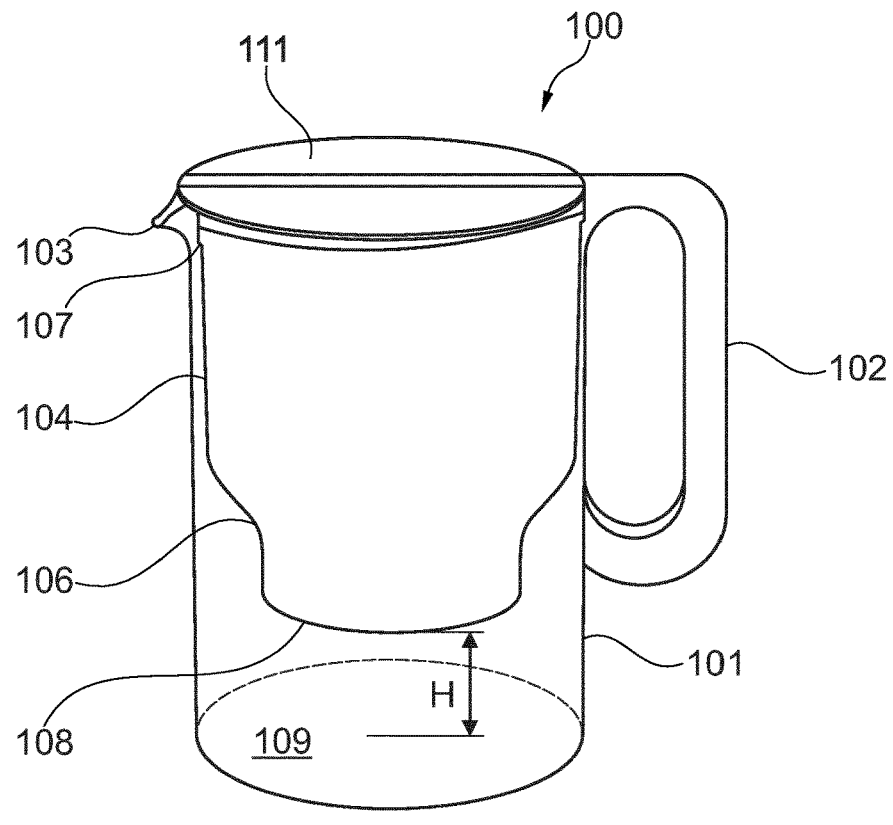
FIG. 1 shows a filter device in the shape of a water jug in a perspective view.

Identical or similar elements are provided with the same or similar reference numerals in the figures. In the following description of exemplary embodiments, directional information, such as, for example, "top", "bottom", "upwards" or "downwards" relate to the corresponding position or direction, respectively, in the respectively described figure.

EXEMPLARY EMBODIMENTS

FIG. 1 shows an exemplary embodiment of a device 100 for the filtration of liquids in a perspective view from the side. In the case of the illustrated exemplary embodiment, the device 100 is formed as table water jug and has a collecting vessel 101 for receiving filtered water. A grip 102 is arranged on the collecting vessel 101 for the handling thereof. The collecting vessel 101 furthermore has a pouring spout 103 on its upper edge. During use of the device, a user can grasp the collecting vessel 101 on the grip 102 and can pour out filtered water via the pouring spout 103, for example into a glass (not illustrated). An inflow funnel 104, which is open on the top and which has a receiving chamber 106 for a filter cartridge 200 (FIG. 2) in its lower region, is inserted in the collecting vessel 101. On its upper edge, the inflow funnel 104 has a circumferential flange 107, which rests on an edge of the collecting vessel 101, so that the inflow funnel 104 is held in the collecting vessel 101. A bottom 108 of the inflow funnel 104 thereby has a distance H from a bottom 109 of the collecting vessel 101. The bottom 108 of the inflow funnel 104 has one or several outflow openings, from which filtered water flows out of the inflow funnel 104 into the collecting vessel 101. The inflow funnel 104 is closed on its upper side by means of a removable lid 111, which prevents that dust or dirt particles fall into the inflow funnel 104 during the use of the filter device 100.

Figure 2:
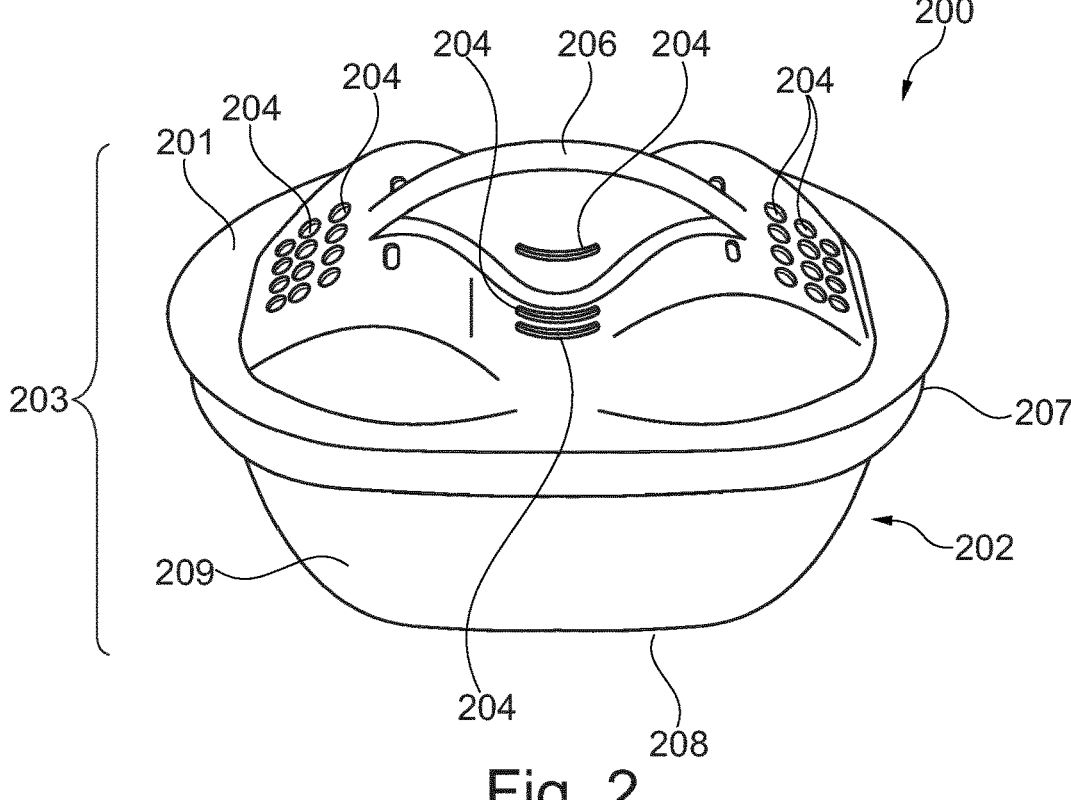
FIG. 2 shows a perspective view of a filter cartridge obliquely from the top.

A schematic perspective view is illustrated in FIG. 2 obliquely from the top onto a filter cartridge 200. A housing upper part or lid 201 forms an upper side of the filter cartridge 200, which sits on a cup-shaped housing bottom part 202. Together, the lid 201 and the housing bottom part 202 form a housing of the filter cartridge 200, which is identified as a whole with the reference numeral 203. Filter material is received in the housing 203 of the filter cartridge. The filter material is present, for example, as filter granulate, which is received loosely or in a filter pocket of liquid-permeable non-woven material, which is not visible in FIG. 2. Different filter materials can be used, in order to remove unwanted substances, ions and/or particles or suspended matter, respectively, from the water.

The lid 201 has a plurality of inflow openings 204, through which unfiltered liquid, in particular raw water, flows into the interior of the filter cartridge 200. A grip part 206 makes it possible to grasp the filter cartridge 200 and to pull it out of the receiving chamber 106 of the inflow funnel 104 for a necessary replacement of the filter cartridge 200. A sealing edge 207 can be seen on the upper edge of the housing bottom part 201. The housing bottom part 201 furthermore comprises a housing bottom 208 and a circumferential side wall 209.

The housing bottom part has an essentially oval shape, which is, for example, 70-80 mm long in the longitudinal direction and 40-50 mm long in the transverse direction. In the case of one exemplary embodiment, the lid 201 can be removed from the housing bottom part 202, whereby the interior of the filter cartridge 200 becomes accessible. When the lid 201 is removed, a user can replace consumed filter granulate with new filter granulate. This replacement can be performed in a particularly uncomplicated and simple manner when the filter granulate is received in a closed filter pocket.

Figure 3:
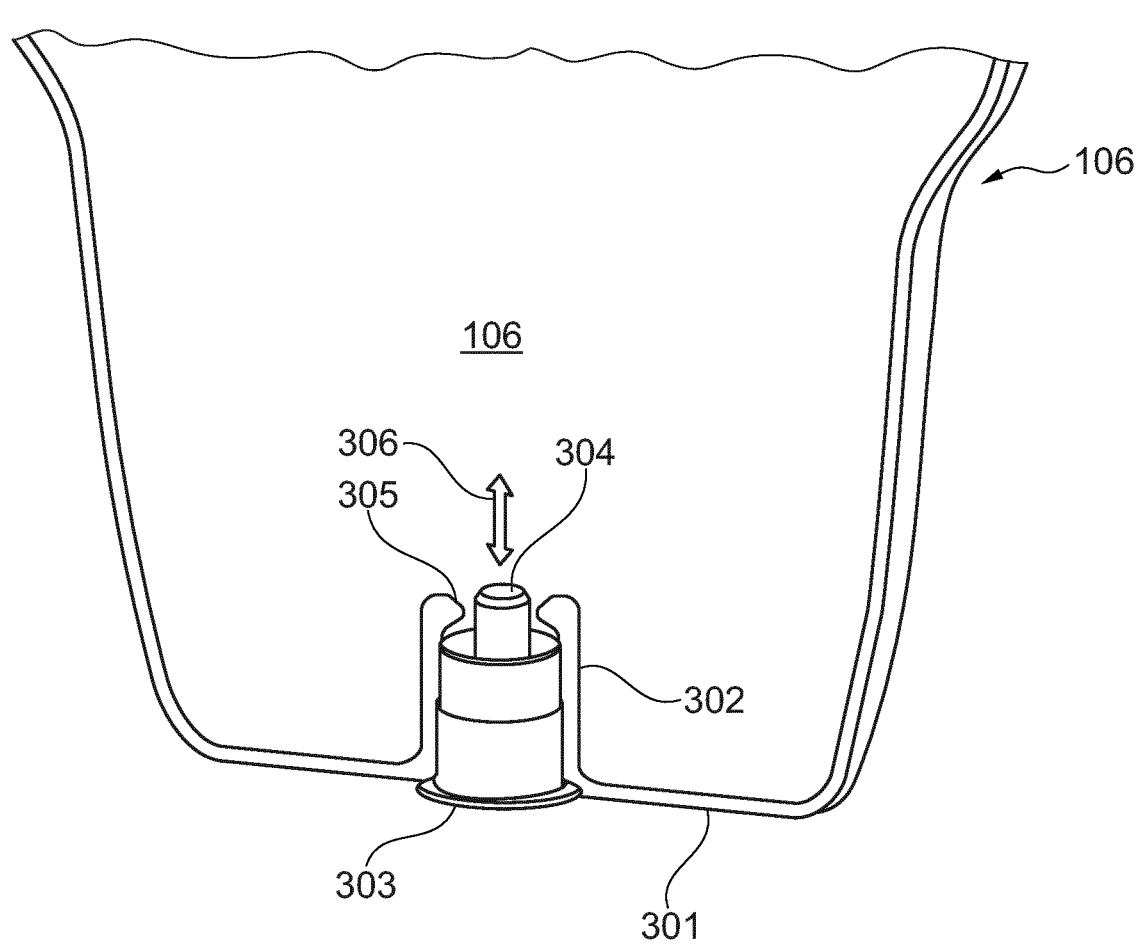
FIG. 3 shows a section from an inflow funnel of the filter device from FIG. 1 in the cross-section.

FIG. 3 shows the receiving chamber 106 of the inflow funnel 104 in the cross-section.

The receiving chamber 106 has a bottom 301, which has a pipe socket 302. A valve bottom part 303, which receives a movable valve body 304, is inserted in the pipe socket 302. The valve body 304 can be moved back and forth in the vertical direction. The direction of movement is suggested in FIG. 3 by means of a double arrow 306. When the valve body 304 assumes an end position, which lies on the bottom in the illustration of FIG. 3, the valve body rests on a valve seat (not illustrated) and closes a flow path for filtered water through the pipe socket 302. The valve seat forms a lower stop for the movement of the valve body 304. When the valve body is raised out of its lower end position, it releases the flow path for water through the pipe socket 302. The pipe socket 302 has a circumferential annular bead 305, which forms an upper stop for the valve body 304, so that the valve body is caught in the pipe socket 302 and cannot fall out even if the inflow funnel is turned upside down. Together, the valve bottom part 303 and the valve body 304 form a valve in the flow path for filtered water.

Figure 4:
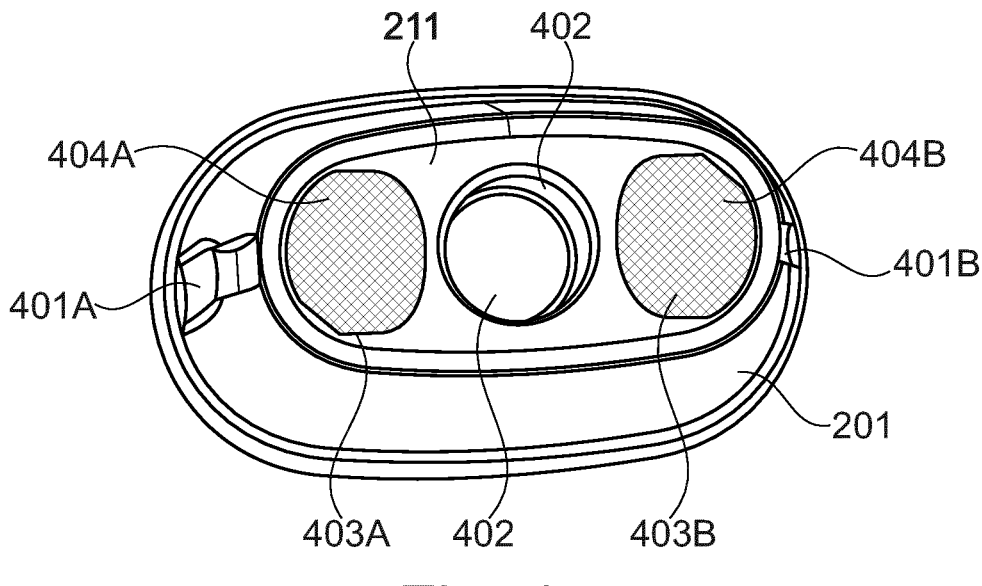
FIG. 4 shows a perspective view of the filter cartridge from FIG. 2 obliquely from the bottom.

A perspective view obliquely from the bottom onto the filter cartridge 300 is illustrated n FIG. 4. The cup-shaped housing bottom part 201 has guide grooves 401A and 401B, which come into engagement with corresponding guide strips (not illustrated) in the receiving chamber 106 of the inflow funnel 104 when the filter cartridge 200 is inserted in the receiving chamber 106. A stable installation position of the filter cartridge 300 in the receiving chamber 106 is supported in this way. FIG. 4 shows the arrangement of an inversion 402 in the bottom 208 of the housing bottom part 201. Outflow openings 403A and 403B, which have outflow sieves 404A and 404B, are provided on both sides of the inversion 402. During the operation of the filter device, the filtered liquid escapes from the filter cartridge 200 through the outflow openings 403A and 403B.

The inversion 402 engages over the pipe socket 302 in the receiving chamber 106. In the case of a filter cartridge 200, which is ready for operation, one of the valve pullers 501-503 shown in FIGS. 5A-5D, which is omitted in FIG. 4 for the sake of clarity, is arranged in the inversion 402.

Figures 5A, 5B, 5C, 5D:
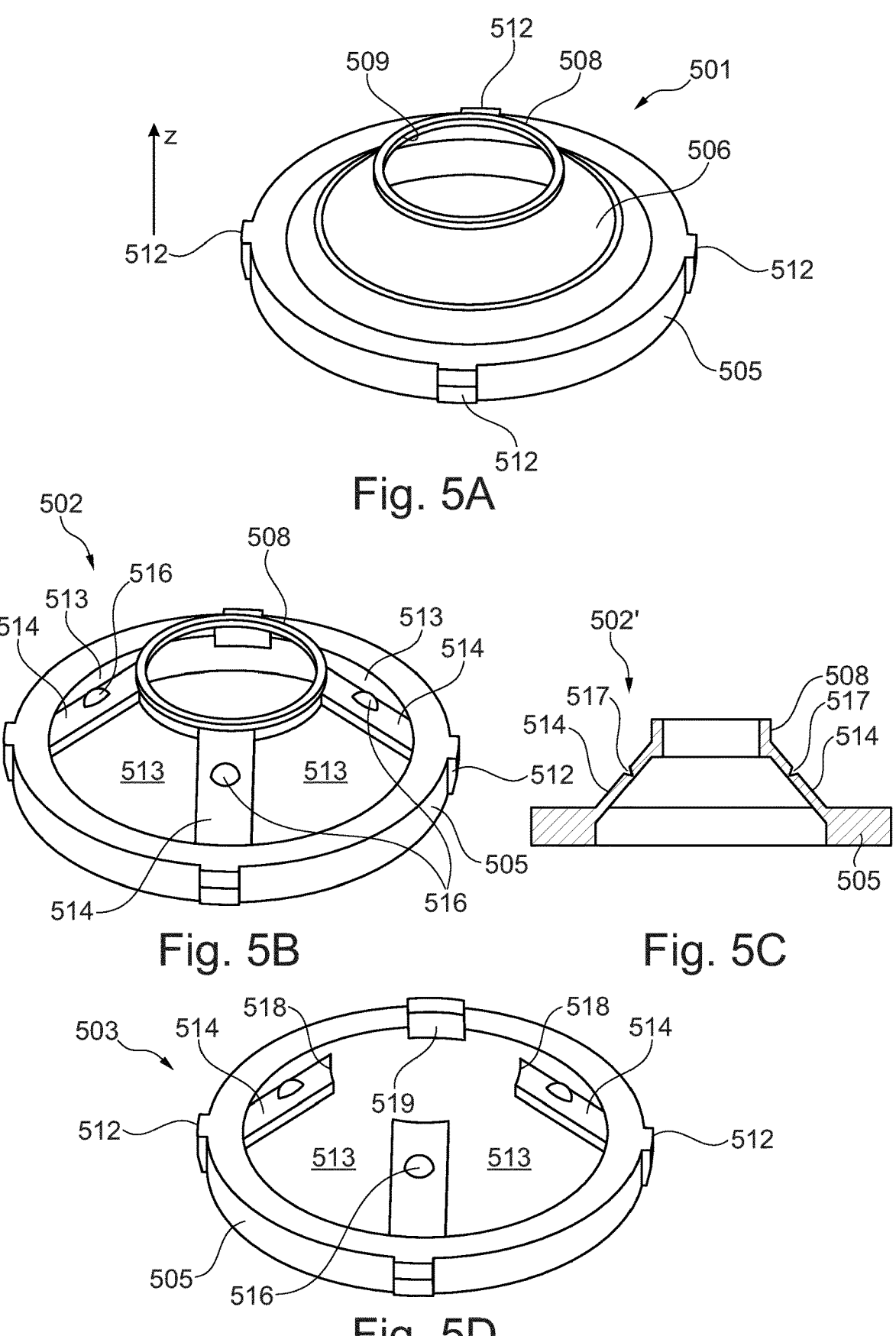
FIG. 5A-5D show a first, second, and third exemplary embodiment of a valve puller for the filter cartridge from FIG. 2.

FIG. 5A shows a first exemplary embodiment of a valve puller 501. The valve puller 501 has a round main part 505, on which a wall 506 is molded, which forms an actuation means 507. The wall 506 has the shape of a lateral surface of a truncated cone, the lid surfaces of which are omitted. A circular ring strip 508, the inner side of which works as grip edge 509 and encloses a receiving hole 511, is formed on the pointed end of the truncated cone on the wall 506. Several— for example four—spacing ribs 512, which keep open a flow path for filtered water from the filter cartridge 200, as will be described further below, are formed on the round main part 505. The spacing ribs 512 are formed along a circumference of the main part 505 as well as on the main side of the main part 505, which is located opposite the wall 506. The main part 505 has the shape of a circular ring. The arrow z indicates an axial orientation of the valve puller 501. This convention for the axial direction also applies for the valve pullers 502, 503 shown in FIGS. 5B-5D.

A second exemplary embodiment of a valve puller 502 is illustrated in FIG. 5B, which has four windows 513 in the wall 506. Between the windows 513, the wall 506 is reduced to strips 514, which are connected to the main part 505 on the one hand and to the ring strip 508 on the other hand. Humps 516, which have the shape of a spherical section, for example, are formed on the strips.

A variation of the second exemplary embodiment of a valve puller 502' is illustrated in the cross-section in FIG. 5C. The valve puller 502' differs from the valve puller 502 in notches 517, which are provided instead of the humps 516. In FIG. 5C, the notches 517 are attached in the struts 514 from the outside to the inside. In the case of a modified variation, the notches 517 can also be arranged in the struts from the inside to the outside, thus on the opposite side of the strut 514.

In the case of a non-illustrated modification of the valve pullers 502, 502', the ring strip 508 is interrupted and consists of several circular arcs, in particular a number of circular arcs, which corresponds to the number of strips 514 of the valve puller 502, 502'. In the case of this modification, the strips 415 can be deflected more easily opposite to the direction z in response to the insertion of the filter cartridge 200 in the receiving chamber 106.

Figure 5E:
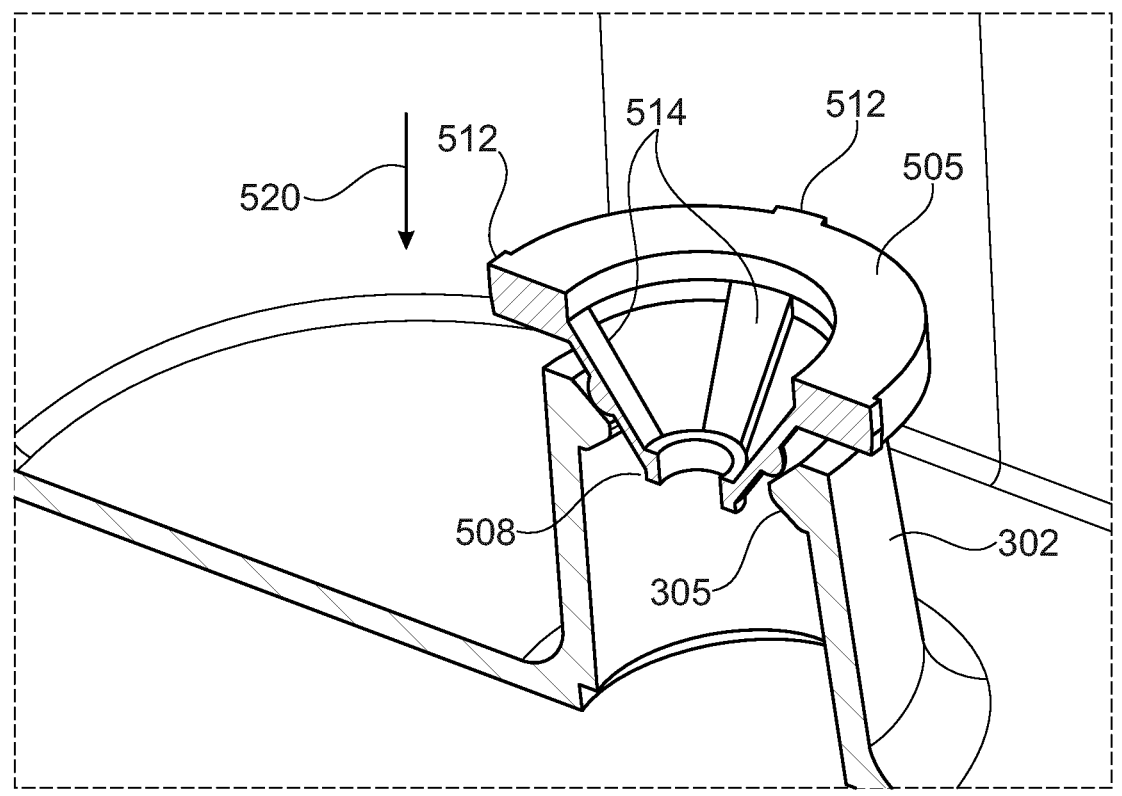
FIG. 5E shows a section of a receiving chamber comprising the valve puller from FIG. 5B in the cross-section.

Lastly, a third exemplary embodiment of a valve puller 503 is shown in FIG. 5D, which differs from the valve puller 502 in FIG. 5B in that the windows 513 extend all the way into the receiving hole 511 and the ring strip 508 is not present. The strips 514 are thus connected to the main part 505 on one end and, on their other end, have a free end 518, the inner surfaces 519 of which form the grip edge 509. The inner surfaces 519 are oriented in the axial direction and thus rest on the valve body 304 essentially over the entire surface when the filter cartridge 200 is inserted in the receiving chamber 106. FIG. 5E shows the valve puller 502 in an exemplary manner in a perspective sectional view, as it sits on the pipe socket 302, wherein the filter cartridge 200 is omitted in the illustration for the sake of clarity. The valve puller 502 protrudes into the pipe socket 302, with the ring strip 508 first. The humps 516 thereby rest on the annular bead 305. When the valve puller 502 is pushed into the pipe socket 302 in response to the insertion of the filter cartridge in the receiving chamber 106 in the arrow direction 520, the strips 514 are elastically deformed, whereby the ring strip 508 will be compressed and will be raised opposite to the arrow direction 520. The compressing of the ring strip 508 has the effect that the free diameter of the receiving hole 511 decreases. The ring strip 508 is thereby in frictional contact with the valve body 304, in particular with the actuation section 606 (FIGS. 6A, 6B), and raises the valve body into its second position. The compression of the ring strip 508 is not absolutely necessary in order to establish a frictional contact to the valve body 304, which is sufficient to be able to raise the valve body. A frictional contact sufficient for this can already be established when the valve body 304 glides into the receiving hole 511 in response to the insertion of the filter cartridge 200 in the receiving chamber 106. The humps 516 thereby act like a bearing point for a two-sided lever, which is formed by the strips 514. The compressive force, which is exerted in response to the insertion of the filter cartridge 200 in the receiving chamber 106, is transferred via the main part 505 to the valve puller 502. In the case of the valve puller 502', the strips 514 deform at the point where the notches 517 are arranged when the strips bear against the annular bead 305. The notches 517 are preferably spaced apart so far from the main part 505 that they are spaced apart from the annular bead 305.

In the case of the valve puller 503, the strips 514 are likewise deformed elastically in a corresponding way, whereby the inner surfaces 519 of the strips 514 approach one another and move upwards opposite to the arrow direction 520.

In the case of the valve puller 501, the wall 506 is deformed in response to the insertion of the filter cartridge 200. The ring strip 508 is thus compressed in the same way as in the case of the valve puller 502 and is raised opposite to the arrow direction 517. In this case, a sufficient frictional contact is also already created between the ring strip 508 and the valve body 304 when the valve body glides into the receiving hole 511 of the valve puller 502.

Figure 6A:
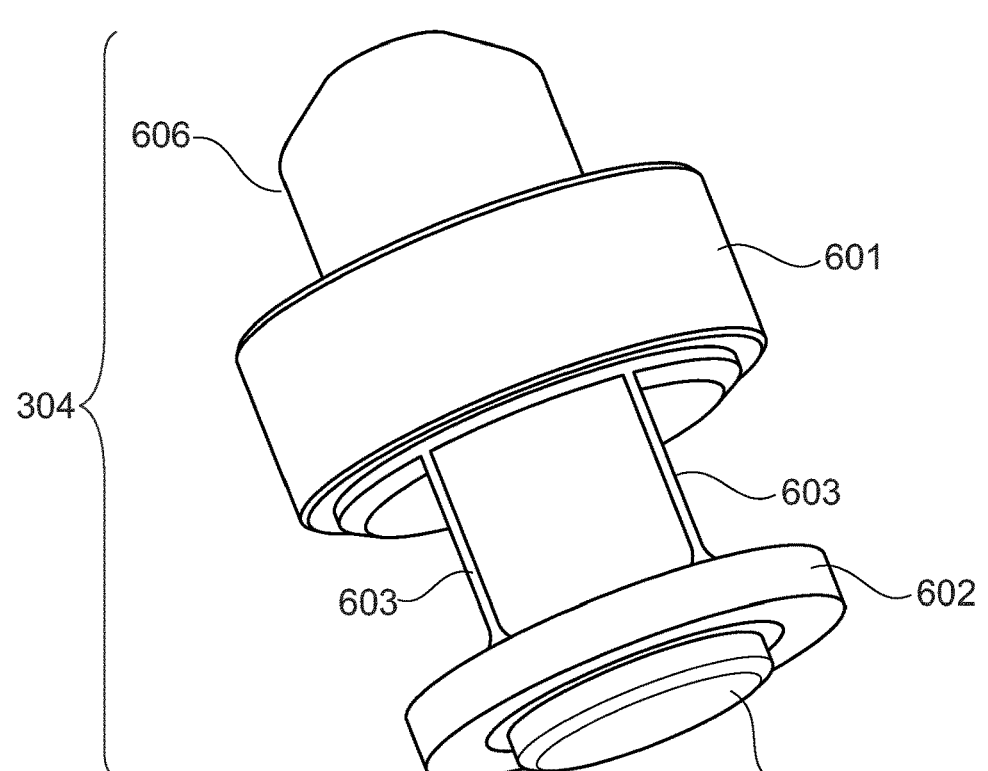
FIG. 6A shows a valve body in a perspective view.

FIG. 6A shows the valve body 304 in a perspective view. As it is illustrated in FIG. 3, the valve body 304 is received in the pipe socket 302 and can move back and forth in the pipe socket 302 in the vertical direction (FIG. 3, double arrow 306). Two guide rings 601, 602 ensure the guidance of the valve body 304 in the pipe socket 302, which guide rings are spaced apart from one another and the outer diameter of which is slightly smaller than the inner diameter of the pile socket 302, so that the valve body 304 is guided with play within the pipe socket 302. The two guide rings 601, 602 are connected to one another by means of webs 603. A sealing surface 604 is formed on the side of the valve body 304, which is located on the bottom in the installation position. A conical actuation section 606 is arranged on the side of the valve body 304, which is located on the top in the installation position.

Figure 6B:
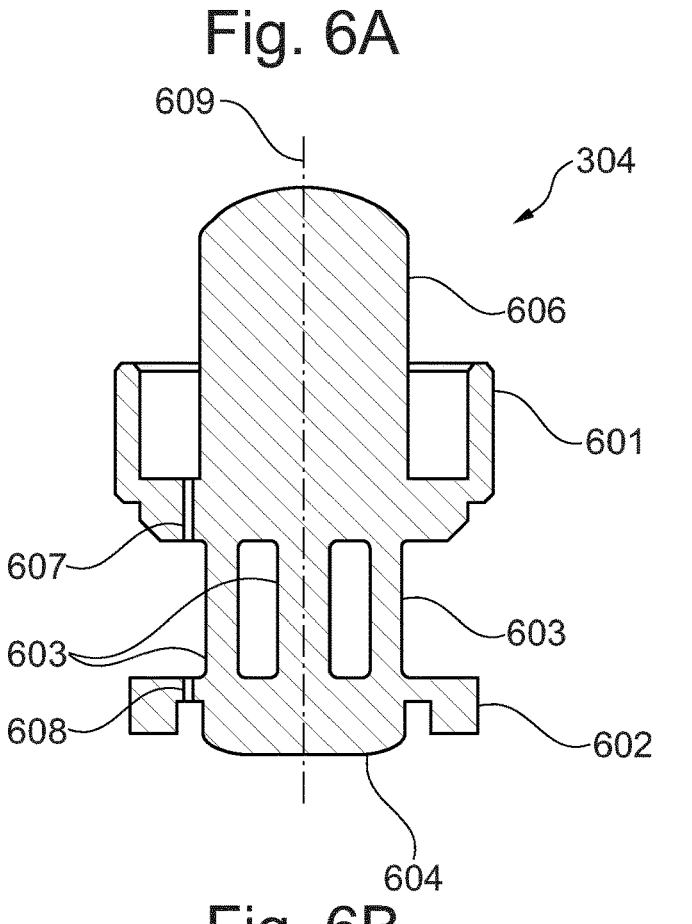
FIG. 6B shows the valve body from FIG. 6A in the cross-section.

The valve body 304 is illustrated in the cross-section in FIG. 6B. The guide rings 601, 602 have apertures 607, 608, which provide a flow path for liquids, in particular for water, in the axial direction of the valve body 304. The axial direction runs along an axis 609, which is shown as dot-dash line.

Figure 7A:
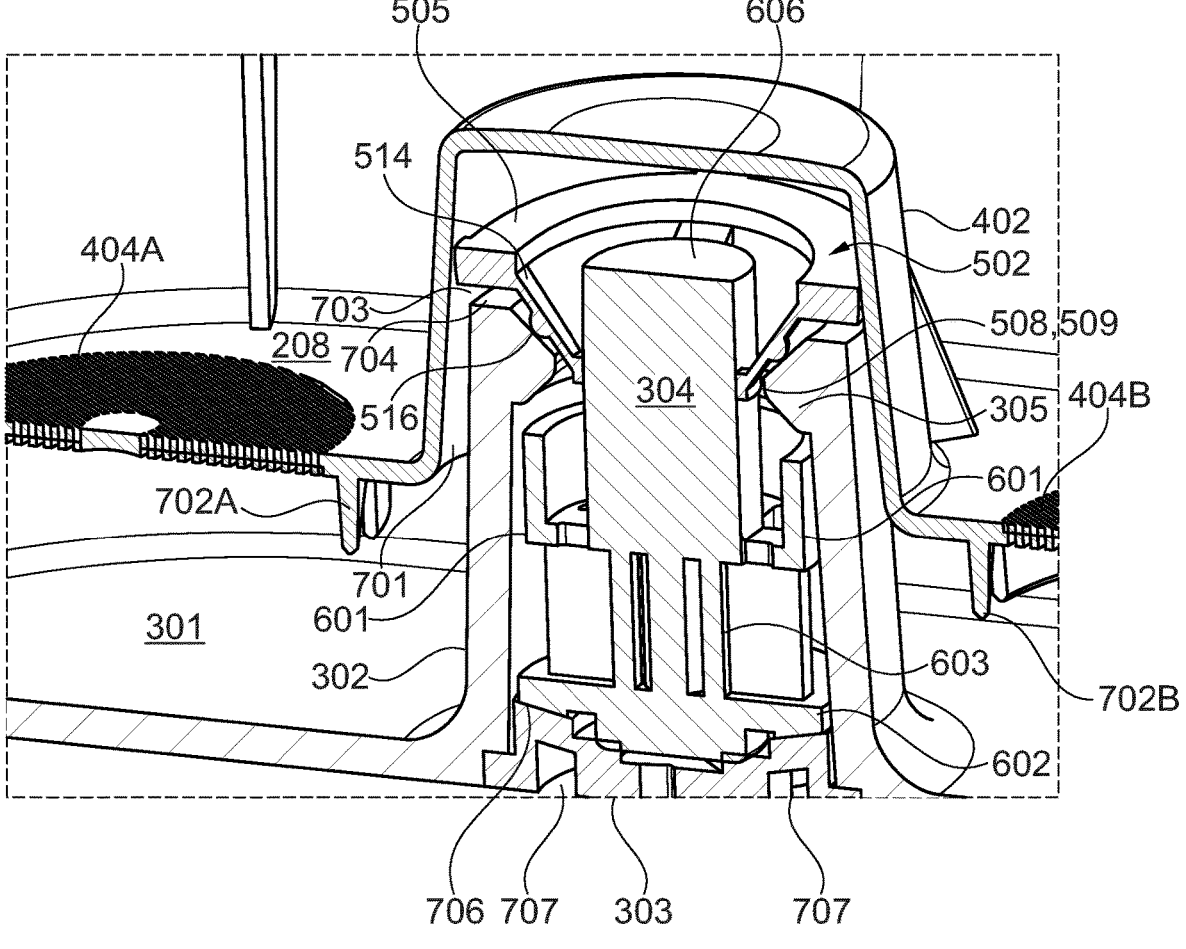
FIG. 7A shows a section from the receiving chamber with inserted filter cartridge, before the filter cartridge reaches its end position.

FIG. 7A shows a section of the receiving chamber 106 comprising a filter cartridge 200 in the cross-section. The filter cartridge is inserted in the receiving chamber 106, whereby the inversion 402 engages over the pipe socket 302. A ring gap 701 is thereby created between the pipe socket 302 and the inversion 402. The housing bottom 208 of the filter cartridge 200 is located at a distance above the bottom 301 of the receiving chamber 106. The outflow sieves 404A, 404B, which are surrounded by a ring-shaped edge 702A or 702B, respectively, in order to equalize the water stream, can be recognized in the housing bottom 208 of the filter cartridge 200.

The valve puller 502 is inserted in the inversion 402 with a press fit. In the illustration shown in FIG. 7A, the filter cartridge 200 has not yet reached its end position, which it assumes during operation of the filter device 100, as can be recognized due to a distance 703 between a front face 704 of the pipe socket 302 and the main part 505. The shown position of the filter cartridge is identified as position I. The actuation section 606 is nonetheless received in the receiving hole 511, so that the grip edge 509 is in frictional contact with the actuation section 606.

The pipe socket 302 is closed by means of the valve bottom part 303, which provides a valve seat 706 for the valve body 304 and which has at least one outlet opening 707, which is or are closed, respectively, by the valve body 304 when the valve body 304 bears against the valve seat.

Even though the guide sections 601, 602 of the valve body 304 flow for a longitudinal back and forth movement 306 (FIG. 3), the valve body 304 remains caught in a captive manner between the valve bottom part 303 and the annular bead 305. The actuation section 606 of the valve body 304 protrudes from the pipe socket 302.

Figure 7B:
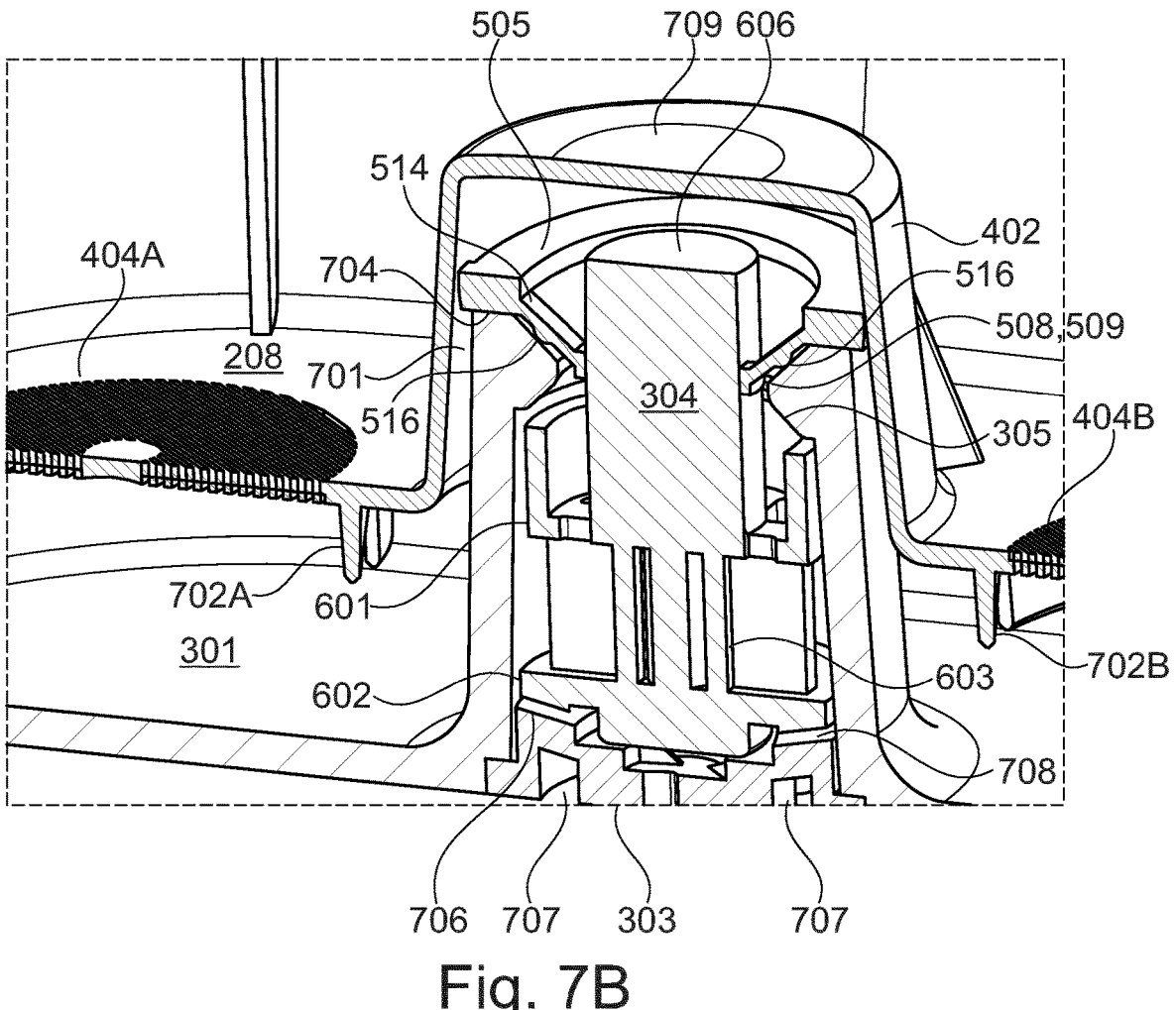
FIG. 7B shows the section from FIG. 7A with the filter cartridge in its end position.

The valve puller 502 is configured to pull the valve body 304 upwards away from the valve seat when the filter cartridge 200 is moved out of the position I shown in FIG. 7A into the position II illustrated in FIG. 7B.

FIG. 7B shows the filter cartridge 200 in an end position (position II), in which the main part 505 rests on the front face 704 of the pipe socket 302. The humps 516 rest on the annular bead 305. Due to the compressive force, which is transferred to the main part 505 in response to the insertion of the filter cartridge 200 in the receiving chamber 106, the ring strip 508 or the grip edge 509, respectively, has raised the valve body 304 from the valve seat 706, so that a gap 708 is created between the valve bottom part 303 and the valve body 304, and the outlet openings 707 are open. The raising of the valve body 304 takes place when the filter cartridge 200 transitions from the position I shown in FIG. 7A into the position II. The frictional contact between the ring strip 508 and the valve body 304 is sufficient to raise the valve body 304.

In the position II of the filter cartridge 200, the valve body 304 releases a flow path for the filtered water. The water flows out of the outflow sieves 404A, 404B, rises upwards in the inversion 402, and flows past the main part 505 between the spacing ribs 512. The water then flows through the windows 513 and the apertures 607, 608 in the valve body 304, in order to finally flow out of the outlet openings 707. The windows 513 are provided in the valve pullers 502 and 503, but not in the case of the valve puller 501.

The valve puller 501 is thus only used when the grip edge 509 does not tightly enclose the actuation section 606 of the valve body. This is the case, for example, when structures are provided on the actuation section 606, between which flow channels are formed in the axial direction of the valve body 304.

In the case of a further non-illustrated exemplary embodiment of the filter cartridge 200, spacing ribs are provided in the inversion 402, which hold the main part 505 of the valve puller at a certain distance from a bottom 709 of the inversion 402.

The valve pullers 501-503 also contribute to a stabilization of the filter cartridge in the receiving chamber, independently of whether or not a valve is arranged in the inflow funnel 104. In the latter, the valve pullers 501-503 quasi grasp "at nothing". The valve puller 501 can furthermore be equipped as throttle element for the flow speed of the filtered water through the filter cartridge 200. When the main part 505 rests sealingly on the front face 704 of the pipe socket 302, the flow speed can be set by means of a corresponding dimensioning of the spacing ribs 512. The spacing ribs 512 determine the size of the free spaces between the main part 505 and the wall of the inversion 402. The size of the free spaces can be selected so that the valve puller 501 forms a delimiting element for flow speed through the filter cartridge. The same applies accordingly for the variation of the valve puller 501, in the case of which the wall of the lateral surface is divided into a plurality of lamellae by means of slits.

Figure 8A:
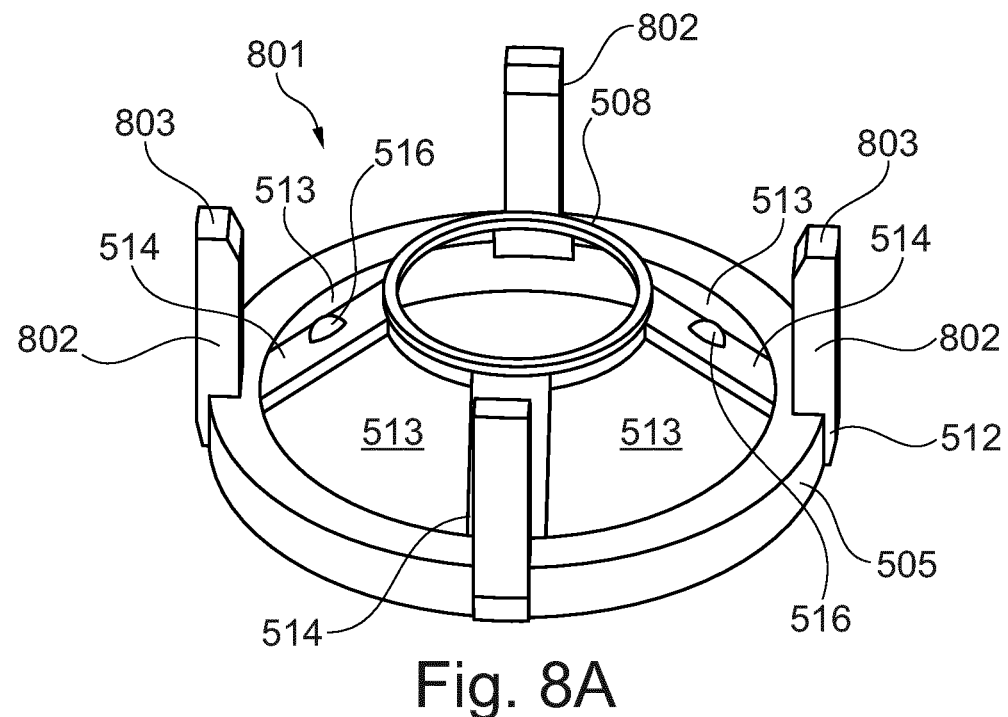
FIG. 8A shows a fourth exemplary embodiment of a valve puller for the filter cartridge from FIG. 2.

A further valve puller 801 is illustrated in FIG. 8A, which, in the interest of an even further improved stabilization, has positioning ribs 802 on the pipe socket 302, which extend perpendicularly away from the main part 505. The positioning ribs 802 rise above the main part 505 in the same direction as the strips 514. On their free ends, the positioning ribs 802 in each case have a run-up slope 803. Apart from that, the valve puller 801 does not differ from the valve puller 502.

Figure 8B:
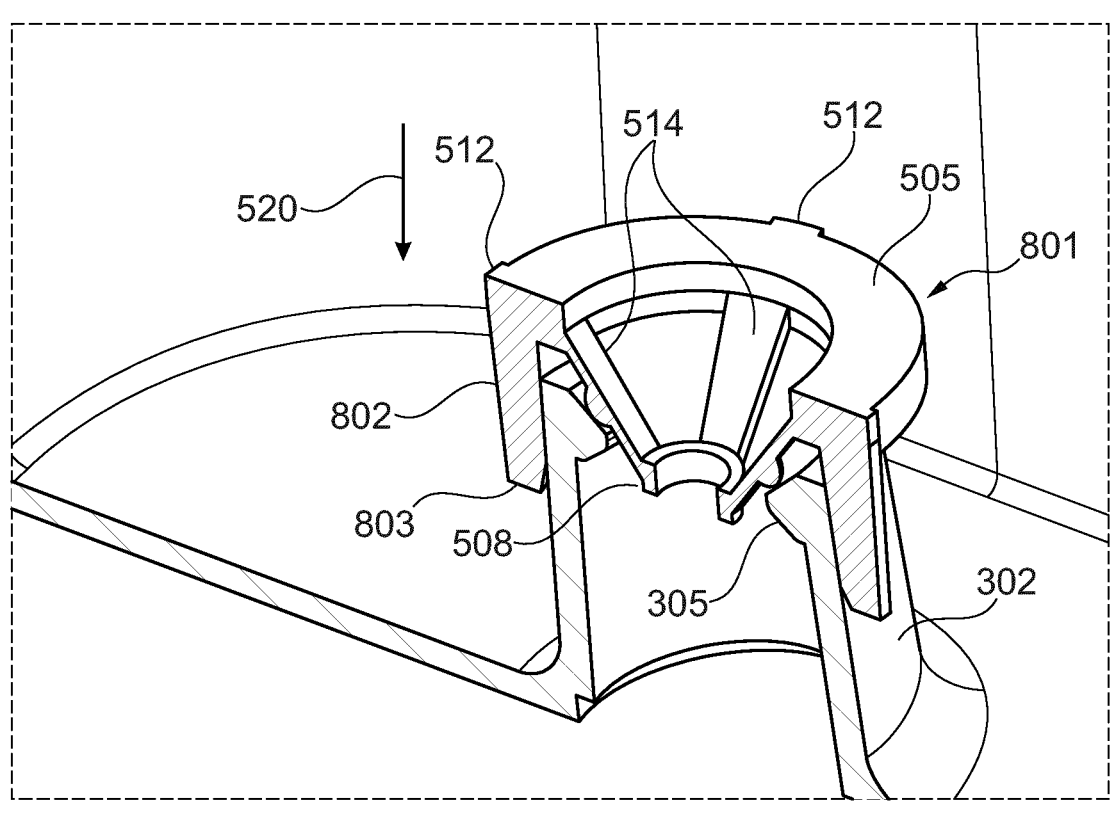
FIG. 8B shows a section of a receiving chamber with the valve puller from FIG. 8A in the cross-section.

FIG. 8B shows the valve puller 801 in a perspective sectional view as it sits on the pipe socket 302, wherein, for the sake of clarity, the filter cartridge 200 is omitted in the illustration. The positioning ribs 802 engage over the pipe socket 302 from the outside and ensure that the valve puller 801 and the cartridge 200 is not canted in response to the insertion in the receiving chamber 104. The run-up slopes 803 simplify the attachment of the valve puller 801 to the pipe socket 302 or the insertion of the filter cartridge 200 in the receiving chamber 104, respectively.

The valve pullers 502, 503, 801 are formed with four strips 514 in FIGS. 5B-5D and 8A. In the case of other exemplary embodiments, in contrast, more or also fewer than four strips 514 are provided. The mode of operation of the valve pullers 502, 503 is not significantly influenced thereby.

In the described exemplary embodiments, the valve puller was illustrated as a part, which is initially separated from the filter cartridge 200 and which is inserted in the inversion 402 of the filter cartridge 200 in a final production step. Alternatively, however, it is also possible to injection-mold the valve puller with the housing bottom part 202 of the filter cartridge 200 in a single manufacturing step.

| List of Reference Numerals | |
| --- | --- |
| 100 | filter device |
| 101 | collecting vessel |
| 102 | grip |
| 103 | pouring spout |
| 104 | inflow funnel |
| 106 | receiving chamber |
| 107 | circumferential flange |
| 108 | inflow funnel bottom |
| 109 | vessel bottom |
| 111 | lid |
| 200 | filter cartridge |
| 201 | housing upper part, lid |
| 202 | housing bottom part |
| 203 | housing as a whole |
| 204 | inflow openings |
| 206 | grip part |
| 207 | sealing edge |
| 208 | housing bottom |
| 209 | circumferential side wall |
| 301 | bottom |
| 302 | pipe socket |
| 303 | valve bottom part |
| 304 | valve body |
| 305 | annular bead |
| 306 | double arrow |
| 401a, 401b | guide groove |
| 402 | inversion |
| 403a, 403b | outlet openings |
| 404a, 404b | outflow sieves |
| 501-503 | valve puller |
| 505 | main part |
| 506 | wall |
| 507 | actuation means |
| 508 | ring strip |
| 509 | grip edge |
| 511 | receiving hole |
| 512 | spacing ribs |
| 513 | windows |
| 514 | strips |
| 516 | humps |
| 517 | notches |
| 518 | free end |
| 519 | front face |
| 520 | insertion direction |
| 601, 602 | guide rings |
| 603 | webs |
| 604 | sealing surface |
| 606 | actuation section |
| 607, 608 | apertures |
| 609 | axis |
| 701 | ring gap |
| 702a, 702b | ring-shaped edge |
| 703 | gap |
| 704 | front face |
| 706 | valve seat |
| 707 | outlet opening |
| 708 | Gap |
| 709 | bottom of the inversion |
| 801 | valve puller |
| 802 | positioning ribs |
| 803 | run-up slopes |

The invention claimed is:

1. A water filter device comprising
an inflow funnel for holding unfiltered raw water,
a filter cartridge located within the inflow funnel, wherein the filter cartridge contains filter medium therein, wherein the filter cartridge has an inflow opening on a first side for receiving the unfiltered raw water, an outflow opening on a second side for providing filtered water and an inversion on the second side,
a valve puller arranged in the inversion, wherein the valve puller includes a hollow ring and an actuation means extending from the hollow ring in an axial direction of the inflow funnel, wherein the actuation means includes a receiving hole delimited by a gripping edge, and a valve located within a flow channel in the inflow funnel, wherein the valve includes an actuation section that is received by the actuation means of the valve puller and can be moved in the axial direction of the inflow funnel in order to close the flow channel when the valve is in a first position and to open the flow channel when the valve is in a second position.

2. The water filter device according to claim 1, wherein the actuation means is formed in the shape of a truncated cone having a pointed end and a lateral surface, the pointed end of which faces away from the hollow ring.

3. The water filter device according to claim 2, wherein the lateral surface of the truncated cone is a closed wall.

4. The water filter device according to claim 2, wherein the lateral surface of the truncated cone includes a plurality of strips separated by a plurality of windows, wherein the plurality of windows extend all the way to the receiving hole, so that the plurality of strips extend from the hollow ring to a free end.

5. The water filter device according to claim 4, wherein the plurality of strips include notches formed in a center thereof.

6. The water filter device according to claim 2, wherein the actuation means further includes a ring strip secured on the pointed end to act as the gripping edge.

7. The water filter device according to claim 4, wherein the actuation means further includes a ring strip secured to the free ends of the plurality of strips to act as the gripping edge.

8. The water filter device according to claim 4, wherein the plurality of strips include humps formed in a center thereof on an outer surface thereof.

9. The water filter device according to claim 4, wherein the plurality of strips are weakened in a center thereof.

10. The water filter device according to claim 1, wherein the actuation means further includes a plurality of spacing ribs formed on an outer circumference of the hollow ring, so that at least one gap is created between the hollow ring and an inner side of the inversion of the filter cartridge.

11. The water filter device according to claim 1, wherein the actuation means is formed elastically such that the gripping edge frictionally couples with the actuation section of the valve when the actuation means is deformed in the radial direction.

12. The water filter device according to claim 1, wherein the actuation means further includes a plurality of positioning ribs arranged on the hollow ring and extending perpendicular away from the hollow ring.

13. A water filter device comprising
an inflow funnel,
a filter cartridge insertable into a receiving channel of the inflow funnel,
a valve arranged in a flow channel, wherein the valve can be moved in an axial direction of the inflow funnel, wherein the flow channel is closed when the valve is located in a first position and open when the valve is located in a second position, and
a valve puller dimensioned to fit into an inversion of the filter cartridge, wherein the valve puller has a hollow ring and an actuation means extending away from the hollow ring in axial direction, wherein the actuation means includes a receiving hole delimited by a gripping edge, and wherein the actuation means is configured to receive an actuation section of the valve.

14. The water filter device of claim 13, wherein the actuation means is formed in the shape of a truncated cone and includes a ring strip secured on the pointed end to act as the gripping edge.

15. The water filter device of claim 14, wherein a lateral surface of the truncated cone is solid.

16. The water filter device of claim 14, wherein a lateral surface of the truncated cone includes a plurality of strips separated by a plurality of windows, wherein the plurality of strips extend from the hollow ring to a free end.

17. The water filter device of claim 16, wherein the plurality of strips include humps formed in a center thereof on an outer surface thereof.

18. The water filter device of claim 16, wherein the plurality of strips include notches formed in a center thereof.

19. The water filter device of claim 13, wherein the actuation means further includes a plurality of spacing ribs formed on an outer circumference of the hollow ring, so that at least one gap is created between the hollow ring and an inner side of the inversion of the filter cartridge.

20. The water filter device of claim 13, wherein the actuation means further includes a plurality of positioning ribs arranged on the hollow ring and extending away from the hollow ring.

* * * * *